(12) United States Patent
Määttänen et al.

(10) Patent No.: US 12,477,423 B2
(45) Date of Patent: Nov. 18, 2025

(54) EPHEMERIS DATA SIGNALING-DELTA OVER TIME

(71) Applicant: Telefonaktiebolaget LM Ericsson (PUBL), Stockholm (SE)

(72) Inventors: Helka-Liina Määttänen, Espoo (FI); Johan Rune, Lidingö (SE); Emre Yavuz, Stockholm (SE); Sebastian Euler, Storvreta (SE); Chao He, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 400 days.

(21) Appl. No.: 18/033,158

(22) PCT Filed: Oct. 22, 2021

(86) PCT No.: PCT/IB2021/059771
§ 371 (c)(1),
(2) Date: Apr. 21, 2023

(87) PCT Pub. No.: WO2022/084946
PCT Pub. Date: Apr. 28, 2022

(65) Prior Publication Data
US 2023/0413141 A1    Dec. 21, 2023

Related U.S. Application Data

(60) Provisional application No. 63/104,088, filed on Oct. 22, 2020.

(51) Int. Cl.
*H04W 36/08* (2009.01)
*H04B 7/185* (2006.01)
*H04W 36/00* (2009.01)

(52) U.S. Cl.
CPC ...... *H04W 36/083* (2023.05); *H04B 7/18519* (2013.01); *H04B 7/18541* (2013.01); *H04W 36/0061* (2013.01)

(58) Field of Classification Search
CPC ............ H04B 7/18563; H04B 7/18519; H04B 7/18532; H04B 7/18541; H04W 36/083; H04W 36/0061
See application file for complete search history.

(56) References Cited

FOREIGN PATENT DOCUMENTS

| JP | 2019521621 A | 7/2019 | |
|---|---|---|---|
| JP | 2019533338 A | 11/2019 | |
| WO | WO-2018052745 A1 * | 3/2018 | ............. H04B 7/195 |

OTHER PUBLICATIONS

ZTE Corporation, Sanechips ("Consideration on ephemeris data handling", 3GPP TSG-RAN WG2 Meeting #108, R2-1915085, Nov. 18-22, 2019) (Year: 2019).*

(Continued)

*Primary Examiner* — Ji-Hae Yea
(74) *Attorney, Agent, or Firm* — Baker Botts L.L.P.

(57) ABSTRACT

According to some embodiments, a method performed by a wireless device comprises: receiving a broadcast of full ephemeris data for a serving cell satellite, the broadcast of full ephemeris data occurring at a first periodicity; determining a position of the serving cell satellite based on the full ephemeris data; receiving a broadcast of delta ephemeris data for the serving cell satellite, the broadcast of delta ephemeris data occurring at a second periodicity more frequent than the first periodicity; and determining a position of the serving cell satellite based on the full ephemeris data and the delta ephemeris data.

25 Claims, 13 Drawing Sheets

600

| 612 – receive a broadcast of full ephemeris data for a serving cell satellite, the broadcast of full ephemeris data occurring at a first periodicity |
|---|
| ↓ |
| 614 – determine a position of the serving cell satellite based on the full ephemeris data |
| ↓ |
| 616 - receive a broadcast of delta ephemeris data for the serving cell satellite, the broadcast of delta ephemeris data occurring at a second periodicity more frequent than the first periodicity– |
| ↓ |
| 618 – determine a position of the serving cell satellite based on the full ephemeris data and the delta ephemeris data |
| ↓ |
| 620 –transmit a request to receive full ephemeris data or delta ephemeris data |

(56) References Cited

OTHER PUBLICATIONS

3GPP TS 38.331 v16.1.0, 3rd Generation Partnership Project; Technical Specification Group Radio Access Network; NR; Radio Resource Control (RRC) protocol specification (Release 16) (Year: 2020).*

3GPP TR 38.811 V15.4.0 (Sep. 2020); 3rd Generation Partnership Project; Technical Specification Group Radio Access Network; Study on New Radio (NR) to support non-terrestrial networks (Release 15).

3GPP TSG-RAN WG2 #107bis, Chongqing, China, Oct. 14-18, 2019; Agenda Item: 6.6.4.2; Source: Ericsson; Title: Ephemeris data (Tdoc R2-1914195 (Is revision of R2-1912597)).

3GPP TSG-RAN WG2 Meeting #108, Reno, Nevada, US Nov. 18-22, 2019; Source: Ericsson (Email discussion rapporteur); Title: Report of email discussion [107bis#67] [NR-NTN]; Agenda Item: x.x.x.x.x (Tdoc R2-1914763).

3GPP TSG RAN meeting #80; La Jolla, USA, Jun. 11-14, 2018; Source: Thales; Title: Study on solutions evaluation for NR to support Non Terrestrial Network; Type: SID new (RP-181370).

3GPP TSG-RAN WG2 Meeting #111; Electronic, Aug. 17-28, 2020; Agenda Item: 8.10.3.1; Source: ZTE Corporation, Sanechips; Title: Offline-106: [NTN] Idle mode issues (R2-2008187).

PCT Written Opinion of the International Searching Authority issued for International application No. PCT/IB2021/059771—Jan. 27, 2022.

PCT International Search Report issued for International application No. PCT/IB2021/059771—Jan. 27, 2022.

3GPP TS 38.331 v16.1.0 (Jul. 2020) 3rd Generation Partnership Project; Technical Specification Group Radio Access Network; NR; Radio Resource Control (RRC) protocol specification (Release 16).

3GPP TR 38.821 v16.0.0 (Dec. 2019) 3rd Generation Partnership Project; Technical Specification Group Radio Access Network; Solutions for NR to support non-terrestrial networks (NTN) (Release 16) [due to size, this has been split into four parts].

Caict, "Consideration on idle mode issues in NTN", 3GPP TSG-RAN WG2 Meeting #112-e, R2-2008814, Nov. 2-13, 2020, 5 Pages, Online.

* cited by examiner

EPHEMERIS DATA SIGNALING-DELTA OVER TIME

PRIORITY

This nonprovisional application is a U.S. National Stage Filing under 35 U.S.C. § 371 of International Patent Application Serial No. PCT/IB2021/059771 filed Oct. 22, 2021 and entitled "EPHEMERIS DATA SIGNALING-DELTA OVER TIME" which claims priority to U.S. Provisional Patent Application No. 63/104,088 filed Oct. 22, 2020, both of which are hereby incorporated by reference in their entirety.

TECHNICAL FIELD

Embodiments of the present disclosure are directed to wireless communications and, more particularly, to ephemeris data signaling for non-terrestrial networks (NTN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) specifications include the Evolved Packet System (EPS). EPS is based on the long-term evolution (LTE) radio network and the Evolved Packet Core (EPC). It was originally intended to provide voice and mobile broadband (MBB) services, but it has continuously evolved to broaden its functionality. For example, Narrowband Internet-of-Things (NB-IoT) and LTE for machines (LTE-M) are part of the LTE specifications and provide connectivity to massive machine type communications (mMTC) services.

3GPP also includes the 5G system (5GS). This new generation radio access technology is intended to serve use cases such as enhanced mobile broadband (eMBB), ultra-reliable and low latency communication (URLLC), and mMTC. The 5G specification includes the New Radio (NR) access stratum interface and the 5G Core Network (5GC). The NR physical and higher layers reuse parts of the LTE specification and add components as needed for the new use cases.

3GPP is also working to prepare NR for operation in a Non-Terrestrial Network (NTN) (see 3GPP Technical Report (TR) 38.811). In parallel, the interest to adapt LTE for operation in NTN is growing. As a consequence, 3GPP is considering introducing support for NTN in both LTE and NR.

A satellite radio access network usually includes the following components: a gateway that connects the satellite network to a core network; a satellite (e.g., a space-borne platform); a terminal (e.g., user equipment (UE)); a feeder link between the gateway and the satellite; and a service link between the satellite and the terminal. The link from gateway to terminal is often referred to as the forward link, and the link from terminal to gateway is often referred to as the return link.

Depending on the orbit altitude, a satellite may be categorized as low Earth orbit (LEO), medium Earth orbit (MEO), or geostationary (GEO) satellite. LEO includes typical heights ranging from 250-1,500 km, with orbital periods ranging from 90-130 minutes. MEO includes typical heights ranging from 5,000-25,000 km, with orbital periods ranging from 2-14 hours. GEO includes heights at about 35,786 km, with an orbital period of 24 hours.

Satellite systems tend to have significantly higher path loss than terrestrial networks due to their significant orbit height. Overcoming the path loss often requires the access and feeder links to be operated in line-of-sight conditions and the UE to be equipped with an antenna offering high beam directivity.

A communication satellite typically generates several beams over a given area. The footprint of a beam is usually an elliptic shape, which has been traditionally considered as a cell. The footprint of a beam is also often referred to as a spotbeam. The footprint of a beam may move over the earth surface with the satellite movement or may be earth fixed with a beam pointing mechanism used by the satellite to compensate for its motion. The size of a spotbeam depends on the system design, which may range from tens of kilometers to a few thousands of kilometers. FIG. 1 illustrates an example satellite network architecture with bent pipe transponders.

In comparison to the beams observed in a terrestrial network, the NTN beam may be very wide and may cover an area outside of the area defined by the served cell. A beam covering adjacent cells will overlap and cause significant levels of intercell interference. A typical approach for overcoming the large levels of interference in the NTN involves configuring different cells with different carrier frequencies and polarization modes.

3GPP TR 38.821 captures the idea that ephemeris data should be provided to the UE, for example, to assist with pointing a directional antenna (or an antenna beam) towards the satellite, and to calculate a correct Timing Advance (TA) and Doppler shift. Although procedures on how to provide and update ephemeris data have not yet been studied in detail, one option is to broadcast ephemeris data in the system information.

A satellite orbit can be fully described using 6 parameters. A user can choose exactly which set of parameters to use; many different representations are possible. For example, the set of parameters (a, $\varepsilon$, i, $\Omega$, $\omega$, t) is often used in astronomy. Here, the semi-major axis "a" and the eccentricity "$\varepsilon$" describe the shape and size of the orbit ellipse; the inclination "i," the right ascension of the ascending node "$\Omega$," and the argument of periapsis "$\omega$" determine its position in space, and the epoch "t" determines a reference time (e.g., the time when the satellites moves through periapsis).

This set of parameters is illustrated in FIG. 2. In FIG. 2, the periapsis refers to a point where the orbit is nearest to Earth, the first point of Aries refers to the direction towards the sun at the March equinox, and the ascending node refers to the point where the orbit passes upwards through the equatorial plane.

As an example of a different parametrization, the two-line element sets (TLEs) use mean motion "n" and mean anomaly "M" instead of a and t. A completely different set of parameters is the position and velocity vector (x, y, z, $v_x$, $v_y$, $v_z$) of a satellite. These are sometimes called orbital state vectors. They can be derived from the orbital elements and vice versa because the information they contain is equivalent. All these formulations (and many others) are possible choices for the format of ephemeris data to be used in NTN. To enable further progress, the format of the data should be agreed upon.

It is important that a UE can determine the position of a satellite with accuracy of at least a few meters. However, several studies have shown that this might be hard to achieve when using the de-facto standard of TLEs. On the other hand, LEO satellites often have GNSS receivers and can determine their position with some meter level accuracy.

Another aspect captured in 3GPP TR 38.821 is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit, for example, the update frequency may range from multiple times a day (e.g., for satellites on very low orbits which are exposed to strong atmospheric drag and need to perform correctional maneuvers often) to weekly (e.g., for satellites on relatively higher orbits or satellites that are exposed to less atmospheric drag).

So, while it seems possible to provide the satellite position with the required accuracy, care needs to be taken to meet these requirements, e.g., when choosing the ephemeris data format or when choosing the orbital model to be used for the orbital propagation.

System information (SI) is an important function in cellular communication systems. It provides the wireless devices (e.g., UEs) with the information needed to access the network and to perform other functions, such as reselecting between cells and receiving Multimedia Broadcast Multicast Services (MBMS) transmissions in a cellular network operating in accordance with a 3GPP standard. In addition, in 3GPP cellular systems the system information mechanism is used for conveying Public Warning System messages, such as Earthquake and Tsunami Warning System (ETWS) messages and Commercial Mobile Alert System (CMAS) messages in 3GPP cellular communication systems.

In LTE, the system information is provided using periodic broadcasting in each cell. The SI is divided into a Master Information Block (MIB) and a number of System Information Blocks (SIBs). The MIB and SIB1 are broadcast with periods that are fixed in the standard. The other SIBs are broadcast with different periods, as configured in SIB1.

For the 5G system referred to as New Radio (NR) (where the RAN is referred to as Next Generation Radio Access Network (NG-RAN) and the core network is referred to as Next Generation Core (NGC)), 3GPP has partly changed the principles for distribution of system information (SI) that are used in LTE.

For NR, the SI is separated into "minimum SI" and "other SI," where the minimum SI is the SI that is required to access the cell and, in the case of NR stand-alone mode (i.e., not in dual connection configuration with LTE), the minimum SI also contains scheduling information for the SIB s of the other SI. The minimum SI consists of the Master Information Block (MIB) and System Information Block type 1 (SIB1). SIB1 is also referred to as "Remaining Minimum System Information" (RMSI).

At least in NR stand-alone mode, the minimum SI is periodically broadcast in a cell, while the other SI may be either periodically broadcast or delivered on-demand, triggered by a request from a UE. The granularity of the division into periodically broadcast SI and on-demand SI is on the level of SI messages. Whether a certain SI message is periodically broadcast or provided on-demand is indicated in SIB1 (using the si-BroadcastStatus parameter). A UE in radio resource control (RRC) idle (RRC_IDLE), inactive (RRC_INACTIVE), or connected (RRC_CONNECTED) state can request an on-demand SI message either using a random access preamble (referred to as the Msg1 based method) or using a random access message 3 (referred to as the Msg3 based method).

If random access preamble (Msg1) transmissions are used, there may be different preambles for requesting different SI message(s) (and consequently the SIB(s) allocated to the SI message(s)) of the other SI. The mapping between a random access preamble and the SI message to be requested is configured in SIB1. If random access message 3 (Msg3) transmissions are used, a UE may in such a message specify which SI message(s) (and consequently the SIB(s) allocated to the SI message(s)) of the other SI the UE wants the network to broadcast/transmit.

A request for an on-demand SI message triggers the network to broadcast the requested SI message for a limited time in accordance with the scheduling information associated with the concerned SI message in SIB1. The network will also transmit an acknowledgement message to the requesting UE. For the Msg1 based request method, the network responds with an acknowledging random access message 2 (Msg2). For the Msg3 based requests method, the network responds with an acknowledging random access message 4 (Msg4).

Periodic broadcast of system information (SI) is designed mostly according to the same principles in NR as in LTE. Similar to LTE, the Master Information Block (MIB) is transmitted in a fixed location in relation to the synchronization signals. The situation for SIB1 is slightly different in NR than in LTE. The periodicity of SIB1 is 160 ms, but it may be repeated a number of times within these 160 ms and the transmission configuration is indicated in the MIB. The remaining SIB s are scheduled in SIB1 and transmitted on the physical downlink shared channel (PDSCH) in the same way as in LTE.

Different SIBs can have different periodicities. SIBs with the same periodicity are allocated to the same SI message and every SI message is associated with a periodic SI-window within which the SI message should be transmitted. The SI-windows of the different SI messages have different periodicities, are non-overlapping and they all have the same duration. Note that the exact transmission occasion of an SI message is not configured, only the window within which it will be transmitted. To indicate that a PDSCH transmission contains an SI message, the cyclic redundancy check (CRC) of the physical downlink shared channel (PDCCH) scheduling downlink control information (DCI) which allocates the PDSCH transmission resources is scrambled with the System Information Radio Network Temporary Identifier (SI-RNTI).

A receiving UE leverages the non-overlapping property of the SI-windows to identify which SI message it receives (and thus which SIBs the SI message contains). The SI messages themselves do not include an indication to distinguish one SI message from the other. The principle of allocating SIBs to SI messages and scheduling of SI messages in SI-windows is illustrated in FIG. 3. In FIG. 3, each SI message is transmitted in its own SI-window, whose occurrence in time depends on the SI message periodicity and the SI message's position in the list in SIB1.

Note that every SI message has a configured schedule, irrespective of whether it is periodically broadcast or provided on-demand. In the latter case, the scheduled broadcast occasions are used only when the network (e.g., gNB) has received a request for the concerned SI message.

The ASN.1 definitions of the SI scheduling related parameters in SIB1 and associated field descriptions are indicated below.

SI-SchedulingInfo information element

```
-- ASN1START
-- TAG-SI-SCHEDULINGINFO-START
SI-SchedulingInfo ::=        SEQUENCE {
    schedulingInfoList            SEQUENCE (SIZE (1..maxSI-Message))
OF SchedulingInfo,
    si-WindowLength              ENUMERATED {s5, s10, s20, s40, s80,
s160, s320, s640,
                                  s1280},
    si-RequestConfig             SI-RequestConfig           OPTIONAL,
-- Cond MSG-1
    si-RequestConfigSUL          SI-RequestConfig           OPTIONAL,
-- Cond SUL-MSG-1
    systemInformationAreaID      BIT STRING (SIZE (24))     OPTIONAL,
-- Need R
    . . .
}
SchedulingInfo ::=           SEQUENCE {
    si-BroadcastStatus               ENUMERATED {broadcasting,
notBroadcasting},
    si-Periodicity                   ENUMERATED {rf8, rf16, rf32, rf64,
rf128, rf256,
                                  rf512},
    sib-MappingInfo              SIB-Mapping
}
SIB-Mapping ::=              SEQUENCE (SIZE (1..maxSIB)) OF SIB-
TypeInfo
SIB-TypeInfo ::=             SEQUENCE {
    type                             ENUMERATED {sibType2, sibType3,
sibType4, sibType5,
                                  sibType6, sibType7,
sibType8, sibType9,
                                  sibType10-v1610,
sibType11-v1610,
                                  sibType12-v1610,
sibType13-v1610,
                                  sibType14-v1610,
                                  spare3,       spare2,
spare1, . . . },
    valueTag                     INTEGER (0..31)            OPTIONAL,
-- Cond SIB-TYPE
    areaScope                    ENUMERATED {true}          OPTIONAL
-- Need S
}
-- TAG-SI-SCHEDULINGINFO-STOP
-- ASN1STOP
```

SchedulingInfo field descriptions areaScope
Indicates that a SIB is area specific. If the field is absent, the SIB is cell specific.
si-BroadcastStatus
Indicates if the SI message is being broadcasted or not. Change of si-BroadcastStatus should not result in system information change notifications in Short Message transmitted with P-RNTI over DCI (see clause 6.5). The value of the indication SchedulingInfo field descriptions is valid until the end of the BCCH modification period when set to broadcasting.
si-Periodicity
Periodicity of the SI-message in radio frames. Value rf8 corresponds to 8 radio frames, value rf16 corresponds to 16 radio frames, and so on.

SI-RequestResources field descriptions ra-AssociationPeriodIndex
Index of the association period in the si-RequestPeriod in which the UE can send the SI request for SI message(s) corresponding to this SI-RequestResources, using the preambles indicated by ra-PreambleStartIndex and rach occasions indicated by ra-ssb-OccasionMaskIndex.
ra-PreambleStartIndex
If N SSBs are associated with a RACH occasion, where N >= 1, for the i-th SSB (i = 0, . . . , N-1) the preamble with preamble index = ra-PreambleStartIndex + i is used for SI request; For -continued SI-RequestResources field descriptions N < 1, the preamble with preamble index = ra-PreambleStartIndex is used for SI request.

SI-SchedulingInfo field descriptions si-RequestConfig
Configuration of Msg1 resources that the UE uses for requesting SI-messages for which si-BroadcastStatus is set to notBroadcasting.
si-RequestConfigSUL
Configuration of Msg1 resources that the UE uses for requesting SI-messages for which si-BroadcastStatus is set to notBroadcasting.
si-WindowLength
The length of the SI scheduling window. Value s5 corresponds to 5 slots, value s10 corresponds to 10 slots and so on. The network always configures si-WindowLength to be shorter than or equal to the si-Periodicity.
systemInformationAreaID
Indicates the system information area that the cell belongs to, if any. Any SIB with areaScope within the SI is considered to belong to this systemInformationAreaID. The systemInformationAreaID is unique within a PLMN.

| Conditional presence | Explanation |
|---|---|
| MSG-1 | The field is optionally present, Need R, if si-BroadcastStatus is set to notBroadcasting for any SI-message included in SchedulingInfo. It is absent otherwise. |
| SIB-TYPE | The field is mandatory present if the SIB type is different from SIB6, SIB7 or SIB8. For SIB6, SIB7 and SIB8 it is absent. |
| SUL-MSG-1 | The field is optionally present, Need R, if this serving cell is configured with a supplementary uplink and if si-BroadcastStatus is set to notBroadcasting for any SI-message included in SchedulingInfo. It is absent otherwise. |

The basic principles for SI updates are the same in NR as in LTE. It is built around the concept of SI modification periods. With some exceptions, SI can only be updated at the border between two SI modification periods. Furthermore, a planned SI update has to be announced in the SI modification period prior to an actual SI update. Such announcements are performed using the paging mechanism, i.e., a notification on the paging channel is used to inform UEs in RRC_IDLE, UEs in RRC_INACTIVE and UEs in RRC_CONNECTED state about a coming system information change. In NR, notifications of coming SI updates are conveyed via so-called "Short Messages," i.e., included in the DCI (with the CRC scrambled with the paging RNTI (P-RNTI)) on the PDCCH, with or without an associated scheduled Paging message on the PDSCH. If the UE receives a DCI containing a Short Message including a systemInfoModification indication, the UE knows that the system information will change at the next SI modification period boundary.

A special case of SI update notification via a Short Message on the paging channel is when an etwsAndCmas-Indication parameter in the Short Message indicates that a public warning system message (ETWS or CMAS) has been activated (or changed) in the SI. In this case, the UE knows that the update is applicable immediately and the UE should as soon as possible acquire and read the SIB(s) related to the concerned public warning. The UE has to read SIB1 to find out whether the notification concerns ETWS or CMAS.

SI updates are thus notified via the paging channel and consequently UEs have to monitor the paging channel, not only to receive paging targeting themselves, but also to receive possible SI update notifications (including public warning system (PWS) notifications). UEs in RRC_IDLE and RRC_INACTIVE state monitor their regular paging occasions (POs), i.e., one per paging discontinuous reception (DRX) cycle, and UEs in RRC_CONNECTED state can monitor any PO for SI update notifications, but should monitor at least one PO per default paging cycle (indicated by the defaultPagingCycle parameter in SIB1).

There currently exist certain challenges. For example, ephemeris data consists of at least five parameters describing the shape and position in space of the satellite orbit. It also includes a timestamp, which is the time when the other parameters describing the orbit ellipse were obtained. The position of the satellite at any given time in the near future can be predicted from this data using orbital mechanics. The accuracy of the prediction, however, degrades for projections further and further into the future. The validity time of a certain set of parameters depends on many factors like the type and altitude of the orbit, but also the desired accuracy, and ranges from the scale of a few days to a few years.

3GPP may adapt NR, and possibly LTE, for operation in an NTN. In NR and LTE, when a UE is turned on it is expected to perform an initial search over its supported frequency bands for a PLMN and a cell to camp on. In an NTN, a UE using a directional antenna must in worst case search for a satellite to camp on over the entire sky, from horizon to horizon. This effort, and thus the time required for the initial search, can be reduced significantly by providing the UE with ephemeris data, which informs the UE about the location of the satellites and thus where it has to point its antenna.

A similar problem arises when the UE should search for cells transmitted from another satellite, e.g., in preparation for a handover, where the network only informs the UE about the frequency (and possibly PCI) of neighboring cells.

SUMMARY

Based on the description above, certain challenges currently exist with non-terrestrial networks (NTN). Certain aspects of the present disclosure and their embodiments may provide solutions to these or other challenges. For example, in some embodiments, the broadcast of ephemeris data is divided into infrequent broadcasts of the full ephemeris data (self-contained and with full accuracy) and more frequent broadcasts of delta-signaling, indicating only the changes in the ephemeris data.

For some embodiments, a UE that has received the full ephemeris data can maintain accurate ephemeris data by receiving subsequent broadcasts of delta-signaling and applying these changes to the stored ephemeris data.

In some embodiments, the network may notify UEs in a serving cell within a modification period regarding system information update, as in legacy, to indicate that additional broadcast of ephemeris data is scheduled to be broadcasted in the next modification period Some embodiments include methods for expressing the ephemeris parameters as full and delta signaling.

According to some embodiments, a method performed by a wireless device comprises: receiving a broadcast of full ephemeris data for a serving cell satellite, the broadcast of full ephemeris data occurring at a first periodicity; determining a position of the serving cell satellite based on the full ephemeris data; receiving a broadcast of delta ephemeris data for the serving cell satellite, the broadcast of delta ephemeris data occurring at a second periodicity more frequent than the first periodicity; and determining a position of the serving cell satellite based on the full ephemeris data and the delta ephemeris data.

In particular embodiments, the delta ephemeris data comprises a delta based on the full ephemeris data. In some embodiments, the delta ephemeris data is cumulative based on a previous delta ephemeris data.

In particular embodiments, the full ephemeris data and the delta ephemeris data are received via system information.

In particular embodiments, the first periodicity of the full ephemeris data is increased in the time leading up to and just after a cell switch.

In particular embodiments, the method further comprises transmitting a request to receive full ephemeris data or delta ephemeris data. The request may be transmitted over a random access channel (RACH).

In particular embodiments, the ephemeris data is based on a coordinate system with an origin close to a trajectory of the serving cell satellite.

According to some embodiments, a wireless device comprises processing circuitry operable to perform any of the wireless device methods described above.

A computer program product comprises a non-transitory computer readable medium storing computer readable program code, the computer readable program code operable, when executed by processing circuitry to perform any of the methods performed by the wireless device described above.

According to some embodiments, a method performed by a network node comprises: transmitting a broadcast of full ephemeris data for a serving cell satellite, the broadcast of full ephemeris data occurring at a first periodicity; and transmitting a broadcast of delta ephemeris data for the serving cell satellite, the broadcast of delta ephemeris data occurring at a second periodicity more frequent than the first periodicity.

According to some embodiments, a network node comprises processing circuitry operable to perform any of the network node methods described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments enable flexible broadcasting of the ephemeris data because full information can be sent more sparsely and efficiently.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
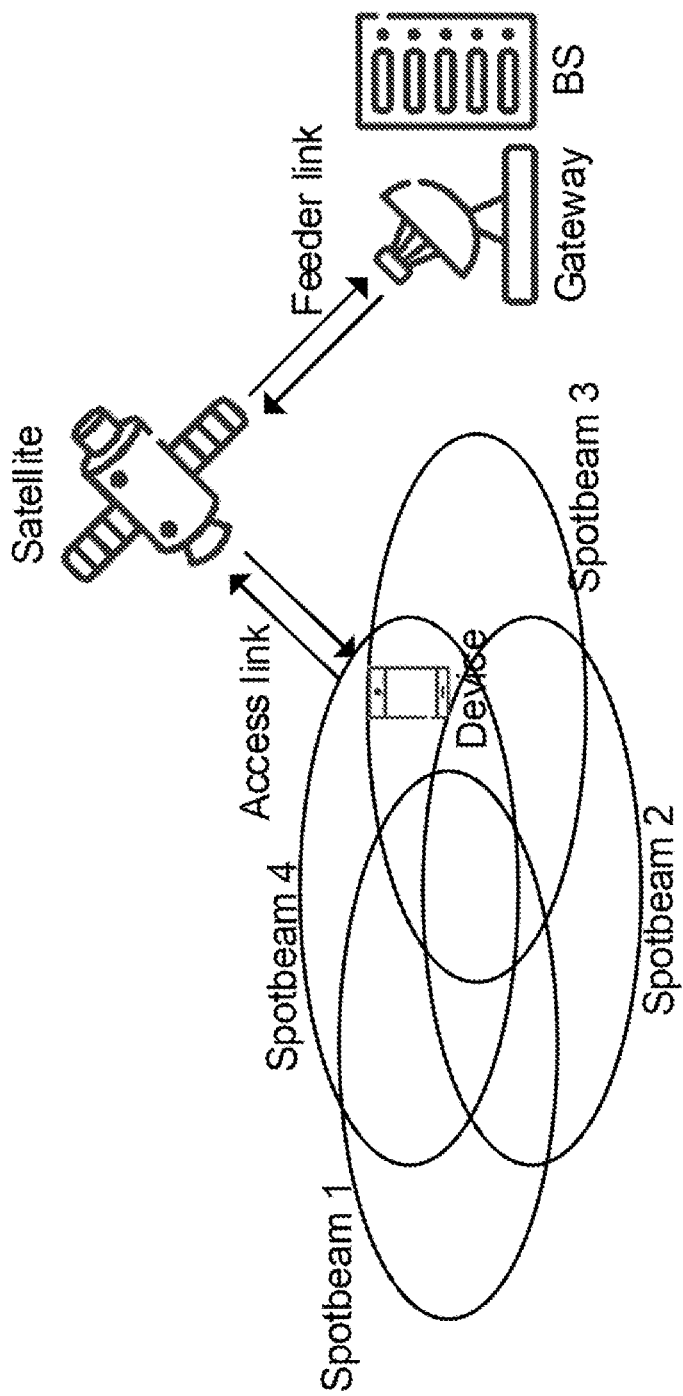
FIG. 1 illustrates an example satellite network architecture with bent pipe transponders.
Figure 2:
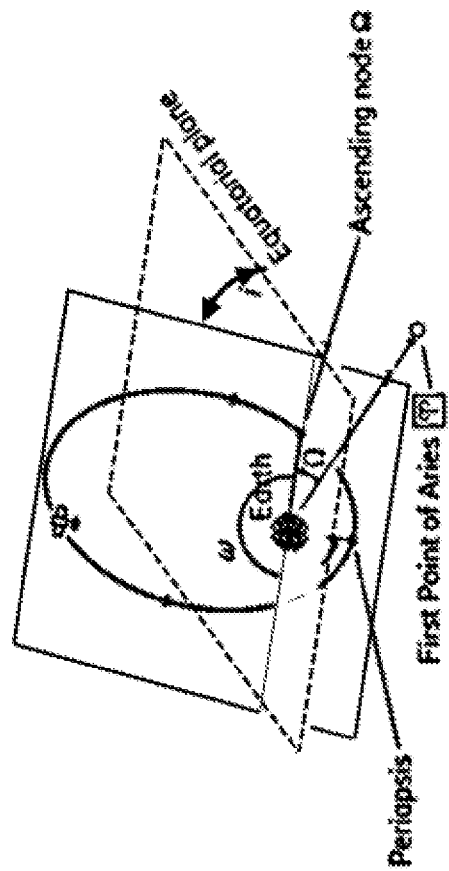
FIG. 2 illustrates an example of orbital elements.
Figure 2:
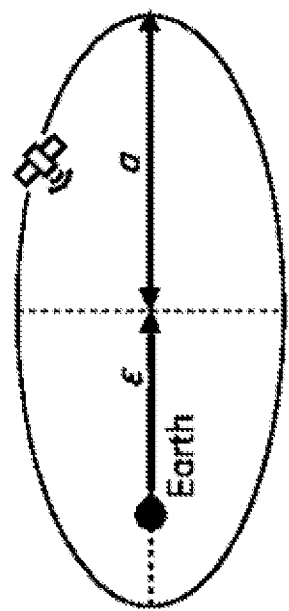
Figure 3:
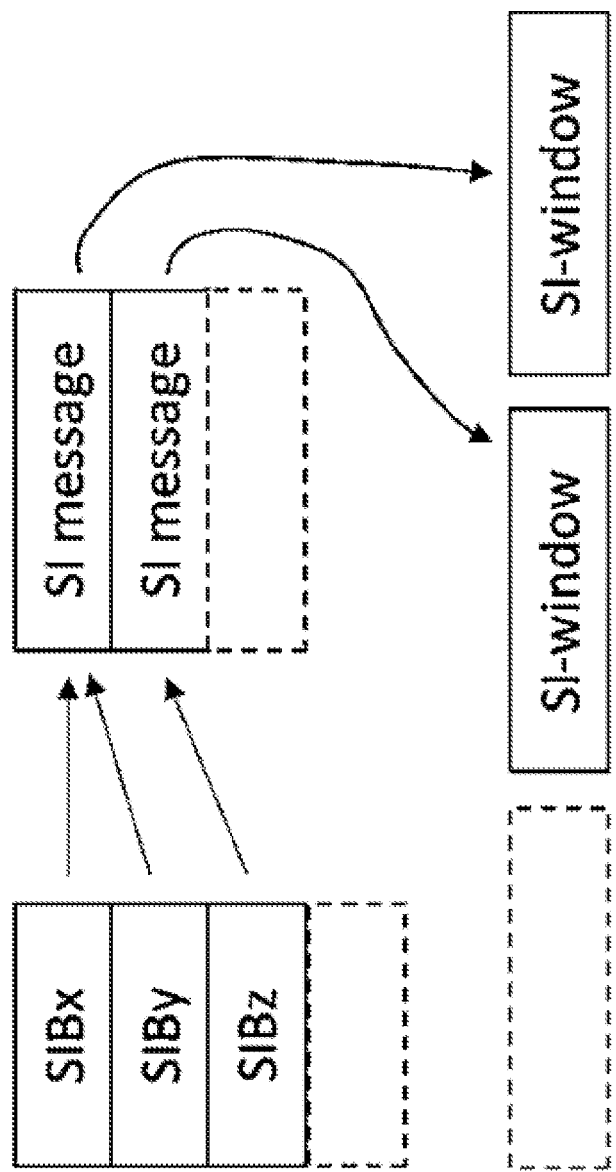
FIG. 3 illustrates allocation of SIBs to SI messages and scheduling of SI messages in SI-windows.

Based on the description above, certain challenges currently exist with non-terrestrial networks (NTN). Certain aspects of the present disclosure and their embodiments may provide solutions to these or other challenges. For example, in some embodiments, the broadcast of ephemeris data is divided into infrequent broadcasts of the full ephemeris data (self-contained and with full accuracy) and more frequent broadcasts of delta-signaling, indicating only the changes in the ephemeris data.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Although particular problems and solutions may be described using new radio (NR) terminology, it should be understood that the same solutions apply to long term evolutions (LTE) and other wireless networks as well, where applicable.

As used herein, the terms "full ephemeris data", "full accuracy", "delta ephemeris data", "delta-signaled ephemeris data", "partial ephemeris data", "partial information" are referring to ephemeris data/information with higher precision enabled by more number of bits (which is described with "full") or differentiate ephemeris data/information with lower precision (fewer number of bits).

As described above, without information on where the NTN user equipment (UE) should point its antenna to find the signals from a certain satellite, the UE would have to scan the whole sky, leading to increased satellite search time.

This in turn, will cause longer initial access delay and possibly a requirement for longer measurement gaps. Providing the UE with information mapping cells and ephemeris data mitigates this problem. With that information, the UE knows where to point its antenna to find a certain cell. To this end, the embodiments described herein enable such mapping and provision of suitable and timely accessible data. The embodiments consist primarily of systems and methods for providing satellite ephemeris data in efficient ways.

A first group of embodiments is related to broadcasting ephemeris data of the satellite serving the UE's current serving cell. Some embodiments include division of ephemeris data broadcasts into full broadcasts and delta broadcasts.

In one set of embodiments, the broadcast of ephemeris data is divided into infrequent broadcasts of the full ephemeris data (self-contained and with high accuracy (elsewhere in the document may use "full accuracy" but the more correct term is "high accuracy")) and more frequent broadcasts of delta-signaling, indicating only the changes in the ephemeris data developed over time. The delta-signaling may indicate the difference from the latest broadcast of full ephemeris data. As an alternative, the delta-signaling may be cumulative such that the first broadcast of delta-signaling following a broadcast of the full ephemeris data indicates the changes from the previous broadcast of full ephemeris data, the subsequent broadcast of delta-signaling indicates the changes from the full ephemeris data resulting from applying the changes indicated by the first broadcast of delta-signaling, etc.

The non-cumulative principle is more robust, because the consequences for a UE that misses a delta-signaling broadcast is smaller than with the cumulative principle, i.e., the UE will regain knowledge of the full ephemeris data after receiving the next delta-signaling broadcast. In addition, a UE has the flexibility to choose, according to its need on the accuracy, how frequently it will keep track of such delta-signaling broadcast. A UE that has received the full ephemeris data can maintain accurate ephemeris data by receiving subsequent broadcasts of delta-signaling and applying these changes to the stored ephemeris data.

On the other hand, the delta-signaling ephemeris data update based on non-cumulative principle requires double memory allocation to store both the latest broadcast of full ephemeris data (as basis for future updates) and the updated ephemeris applying delta-signaled ephemeris (for current use), while the cumulative-principled one needs only a single memory allocation to keep the updated ephemeris data for both current and future usage, e.g., in a Markov chain manner.

To maximize the benefit of limiting the broadcasts of the full ephemeris data of the serving cell's satellite, the full ephemeris data may be placed in an SI message with a long broadcast periodicity. In some embodiments, the periodicity may be even longer than the maximum SI broadcast periodicity that is possible to configure according to the current standard specifications (e.g., 3GPP TS 38.331 version 16.1.0 where the maximum configurable periodicity is 512 radio frames which is equal to 5.12 seconds). To mitigate the possible disadvantages of such long intervals between the full ephemeris data broadcasts, the periodicity extension may be complemented by a UE request for additional broadcast(s) of the full ephemeris data in between the regular broadcasts.

This embodiment may also be combined with more frequent broadcasts when needed the most, e.g., by broadcasting the full ephemeris data more frequently during the initial period after a new satellite takes over the coverage of a certain area, e.g., in the earth-fixed cell case. Possibly, the frequency of the broadcast of ephemeris data may be higher both before and after a satellite switch. A rationale for using increased broadcast frequency both before and after a satellite switch may be that the UE's required TA changes faster due to the satellite movement when the satellite's elevation angle is small than when it is large, implying that the availability of accurate ephemeris data for the serving satellite is more critical when the satellite's elevation angle is small. Notably, small satellite elevation angle typically coincides with the time periods before or after a satellite switch in the earth-fixed cell case (i.e., switches of the satellite responsible for covering a certain geographical (cell) area).

In another embodiment, the network may notify UEs in a serving cell within a modification period regarding system information update, as in legacy, to indicate that additional broadcast of ephemeris data is scheduled to be broadcasted in the next modification period. The additional broadcast of ephemeris data can either be full information or partial, where in addition to full information transmitted infrequently, partial information is transmitted on rather frequent basis with delta signaling. This is mainly intended to coincide with service link or feeder link switches. The network may indicate in the DCI message, which indicates an upcoming system information update and/or schedules the message that carries paging information, that the notification is for an update due to a service link and/or feeder link switch which includes additional broadcast of ephemeris data.

In some embodiments, the size of each delta-signaling ephemeris data may be identical or varying for different time. When the delta-signaling process initiates, or when no other values are requested by the network or UE, a satellite can take a default value pre-defined in the system. In some embodiments, in the RRC-CONNECTED mode, a UE can signal the satellite/network to improve/lower the delta-signaling precision, e.g., to better tracing the satellite or to mitigate broadcast overhead cost. Note that though a single UE's demand may not represent all or not even the majority of the UEs' desire, it is possible to return to state with previous delta-signaling info size upon further requests by other UEs covered by the same satellite. In some embodiments, the satellite or network can decide based on its own observation to increase/decrease the size of delta-signaling ephemeris data, e.g., satellite/network may dedicate more information bits to the delta-signaling ephemeris data when it observes a residual estimation error on time/frequency. Such adjustment on the size of delta-signaling ephemeris includes, as well, the case a full ephemeris data is requested by UE or scheduled by satellite/network if the adjusted size is equal to the size of full ephemeris data.

Particular embodiments represent the ephemeris data of a serving cell in an efficient way using delta signaling. For example, the embodiments related to broadcast of ephemeris data of the serving satellite are particularly interesting in the case where satellite ephemeris data consists of satellite position and velocity vectors (orbital state vectors). Having to signal only the relatively small delta (i.e., difference) from the last satellite position might offer significant savings in signaling load compared with the full satellite position, because the coordinate system will typically be chosen with the Earth's center as the origin.

To save signaling bits, some embodiments define a coordinate system with an origin close to the satellite trajectory, provide the satellite state vectors for a certain period of time in this coordinate system, and then change the coordinate system when the satellite has moved too far from the origin. In these embodiments, the ephemeris data is split in a reference location (which corresponds to the "full ephemeris" described above and might or might not coincide with the satellite position at a certain time), and the position delta towards this reference location. When the coordinate system changes over time, the UE is made aware of the changes. The used coordinate systems, the sequence/order in which they are used and periodic timepoints of switching between coordinate systems may be standardized, such that they are a priori known by the UE and the gNB/satellite. Such a standard could have the form of an algorithm using some ephemeris data or orbital parameters as input data, producing a sequence of coordinate systems (e.g., selecting one of a preconfigured set of sequences of coordinate systems) and coordinate system switching timepoints as output.

For example, if the above is used in combination with the previous embodiments, the network may send the "full ephemeris" with a sparse periodicity and when the switching time approaches, the network may start to signal the delta position to the "full ephemeris" in between the provision of the "full ephemeris". In this way, the UE can track more specifically the satellite movement during the switch when it is likely that several UEs will make random access via a new satellite. In this way, problems that relate to random access issue escalation can be minimized.

The random access issue escalation means that when one UE fails or sends the random access preamble with incorrect time, it may cause issues for other UE's uplink transmissions and thus escalate many uplink issues. This is because the UE can read the full info well in advance, and when the time of switch approaches, or is "on" and the moment of random access becomes timely, the UE does not have to wait for the next full transmission for updates but can get a more often delta that updates the full ephemeris to current time t. Otherwise, the UE needs to extrapolate if there are terms that change over time.

In some embodiments, full ephemeris data is transmitted with a higher frequency prior to, and/or during and/or after the switch. Alternatively, the sequence of coordinate systems and the switching timepoints may be broadcast, e.g. in the system information, or preloaded on the USIM in the UE. In both cases, one possibility is that the information is broadcast or preloaded in the form of a pointer/index to one of a set of standardized sequences of coordinate systems and coordinate system switching timepoints.

In some embodiments, under the assumption that how UEs will predict/calculate on-the-fly the satellite position in near future based on known ephemeris data is available at satellite/network side, satellite only needs to signal 1) the location difference to the new satellite location predicted by UEs (which is also known to the satellite/network), i.e., the prediction/estimation error at UE side; 2) the velocity difference that will be used in reducing the satellite position prediction error in the future. How the UE will predict the satellite position may be up to each manufacturer's implementation, however, a simple prediction method known/agreed to satellite/network/UEs may be standardized, to reduce the cost of sending delta ephemeris data. The on-the-fly prediction method offers more flexibility to broadcast periodicity or timing than the preloaded coordinate system, with a cost of computing power being allocated to such calculation.

Some embodiments use SI broadcast request (SI on-demand). For example, in an extension of the above described embodiments where broadcast ephemeris data is divided into full ephemeris data broadcasts and delta ephemeris data broadcasts, a UE can use the SI request mechanism (either Msg1 based SI request or Msg3 based SI request) to improve the performance.

A target scenario of these embodiments is a UE that leverages the above described broadcast signaling to keep track of the serving satellite's ephemeris data, which misses a broadcast of the full ephemeris data, e.g., because of temporary radio channel quality problems. In this situation, the UE may request an additional broadcast of the full ephemeris data, preferably using an extension of the existing mechanisms for SI request. This requires the UE to transmit on the PRACH, which is not a problem because the UE likely still has a good enough TA estimate and frequency compensation estimate (based on previously acquired satellite ephemeris data and its own position).

This may include extensions of the existing SI request mechanism. One extension may be that an SI message can be made available on-demand while simultaneously being periodically broadcast (currently an SI message is either periodically broadcast or provided on-demand). A second extension may be that in this case the requested SI message should not be bound to its regular schedule (as configured in SIB1), but should be broadcast rather quickly after the request, irrespective of when it will be broadcast the next time according to the regular schedule.

Such an extra on-demand scheduling may be defined in relation to the timing of the request transmission, e.g., that the requested SI message is transmitted in a window with a configurable length starting a configurable time after the transmission of the request. As another option, the extra on-demand scheduling may be an additional version, or instance, of the regular scheduling information, albeit with another periodicity (preferably shorter periodicity, i.e., more frequent broadcast occasions) than the regular schedule, wherein the broadcast occasions configured through the extra schedule are only used when the SI message the extra schedule pertains to (i.e., the SI message containing the full ephemeris data of the serving satellite in this embodiment extension) is requested on demand (i.e., according the same principle that is used for SI messages only available on-demand).

In some embodiments, a special RACH configuration may be used for the requests of additional broadcasts of the serving satellite's full ephemeris data. The special RACH configuration may include special PRACH occasions (and may include dedicated RA preambles) for which the gNB uses an extended RA preamble reception window, which is more tolerant to timing errors in the RA preamble transmission. This facilitates a UE to request broadcast of the full ephemeris data of the serving satellite without a TA estimate that is good enough for transmission of a RA preamble using the regular RACH configuration (for which the gNB uses a RA preamble reception window adapted to RA preambles transmitted with TA estimates derived from reasonable knowledge of the serving satellite's ephemeris data). Optionally, if the Msg1 based SI request method is used, a Msg2 confirming the reception of the RA preamble may include an accurate TA adjustment indication (and possibly a Doppler shift frequency compensation indication) in addition to confirming that the requested SI message will be broadcast. Then the UE gets both a fresh accurate TA and the full ephemeris data of the serving satellite for continued tracking of the ephemeris data based on the delta signaling which enables further TA maintenance and Doppler shift calculation.

As yet another option, a Msg2 confirming a Msg1 based SI message request, or a Msg4 confirming a Msg3 based SI message request, may contain the actual (requested) full ephemeris data of the serving satellite, either instead of broadcasting this information or in addition to broadcasting the information.

Throughout this disclosure, the terms "beam" and "cell" may be used interchangeably, unless explicitly noted otherwise. Although certain embodiments have been described with reference to NTN, the methods proposed apply to any wireless network (e.g., any wireless network dominated by line-of-sight conditions). Certain embodiments (or portions thereof) may be implemented in one or more standards, such as 3GPP release 17+, 3GPP TS 38.331, and/or NR TR 38.821 Rel-16.

Figure 4:
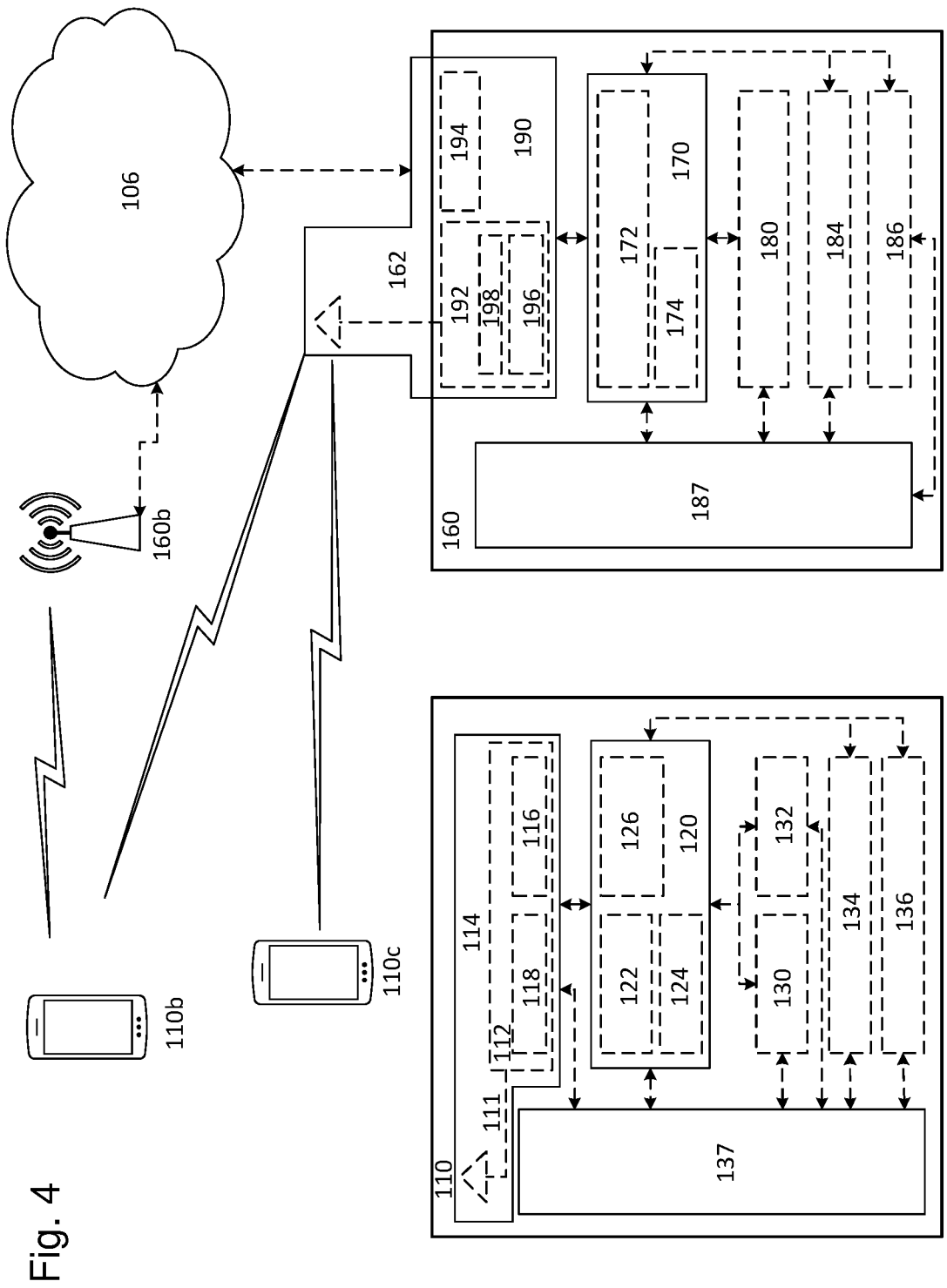
FIG. 4 is a block diagram illustrating an example wireless network.

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V1I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 5:
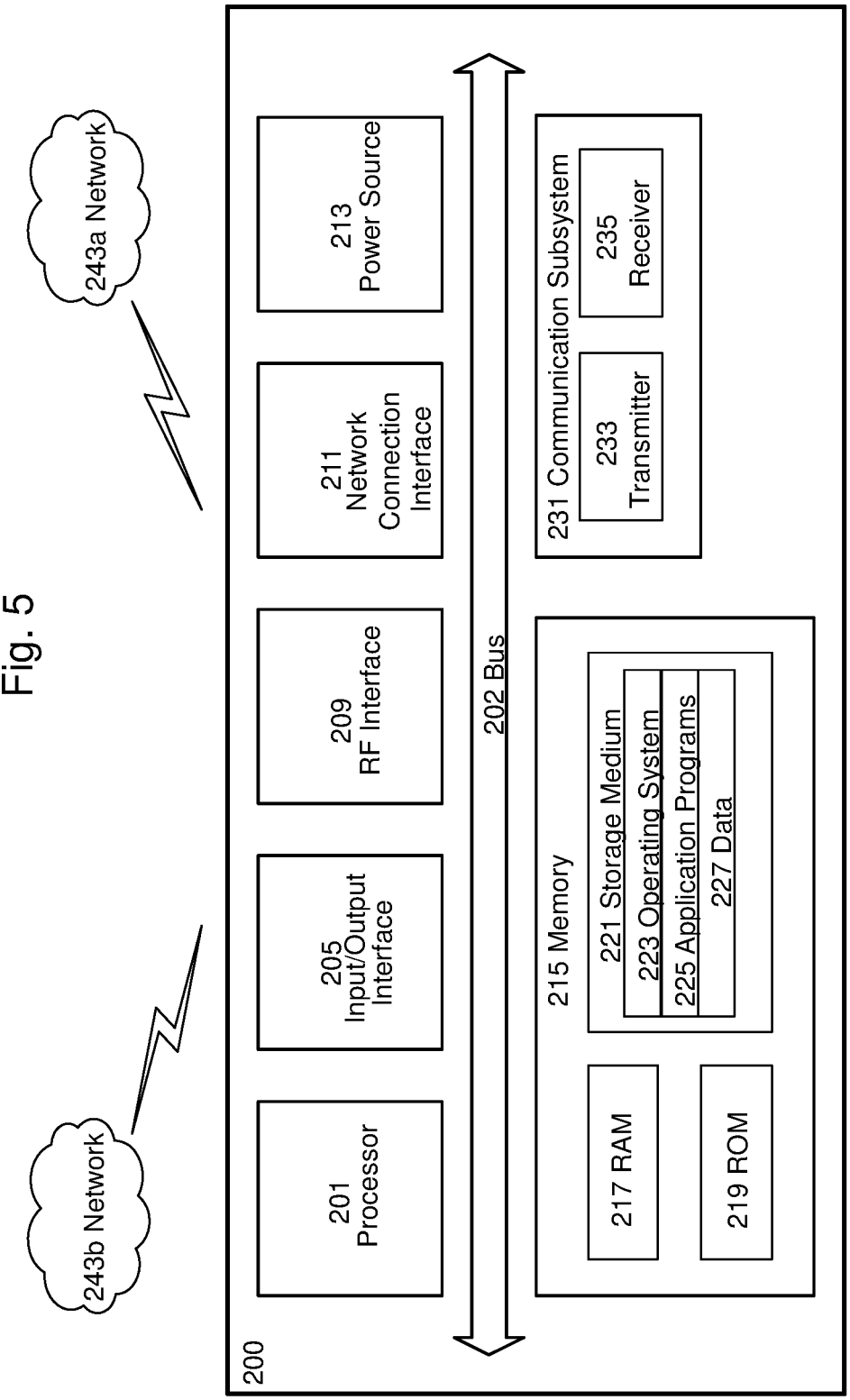
FIG. 5 illustrates an example user equipment, according to certain embodiments.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6A:
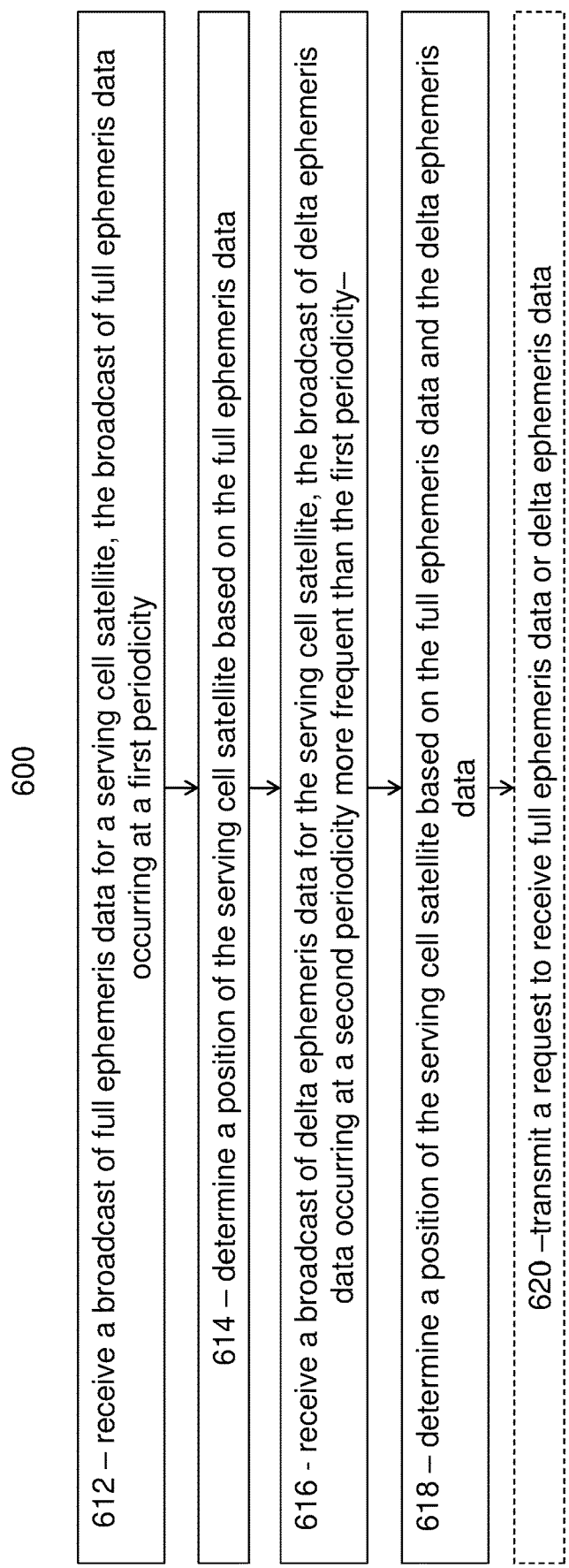
FIG. 6A is a flowchart illustrating an example method in a wireless device, according to certain embodiments.

FIG. 6A is a flowchart illustrating an example method in a wireless device, according to certain embodiments. In particular embodiments, one or more steps of FIG. 6A may be performed by wireless device 110 described with respect to FIG. 4.

The method begins at step 612, where the wireless device (e.g., wireless device 110) receives a broadcast of full ephemeris data for a serving cell satellite, the broadcast of full ephemeris data occurring at a first periodicity. The ephemeris data may comprise any of the ephemeris data described with respect to the embodiments and examples given herein.

At step 614, the wireless device determines a position of the serving cell satellite based on the full ephemeris data. For example, the wireless device may use the ephemeris data to determine a position of the serving cell satellite so that the wireless device may transmit a beam in the proper direction for the serving cell satellite to receive the beam.

Over time, the ephemeris data received at step 614 may degrade in accuracy. At step 616, the wireless device receives a broadcast of delta ephemeris data for the serving cell satellite. The broadcast of delta ephemeris data occurs at a second periodicity more frequent than the first periodicity.

The wireless device may use the delta ephemeris data to update its determinations of the position of the serving cell satellite.

In particular embodiments, the delta ephemeris data comprises a delta based on the full ephemeris data. In some embodiments, the delta ephemeris data is cumulative based on a previous delta ephemeris data.

In particular embodiments, the full ephemeris data and the delta ephemeris data are received via system information.

In particular embodiments, the first periodicity of the full ephemeris data is increased in the time leading up to and just after a cell switch.

At step 618, the wireless device determining a position of the serving cell satellite based on the full ephemeris data and the delta ephemeris data. For example, the full ephemeris data is augmented with the delta ephemeris data to yield a more accurate position estimate.

On some occasions, the wireless device may miss a broadcast of full or delta ephemeris data or may want to refresh its ephemeris data at a time other than at designed broadcast time. In such situations, the wireless device may request an update from the network node.

At step 620, the wireless device transmits a request to receive full ephemeris data or delta ephemeris data. The request may be transmitted over a random access channel (RACH).

Modifications, additions, or omissions may be made to method 600 of FIG. 6A. Additionally, one or more steps in the method of FIG. 6A may be performed in parallel or in any suitable order.

Figure 6B:
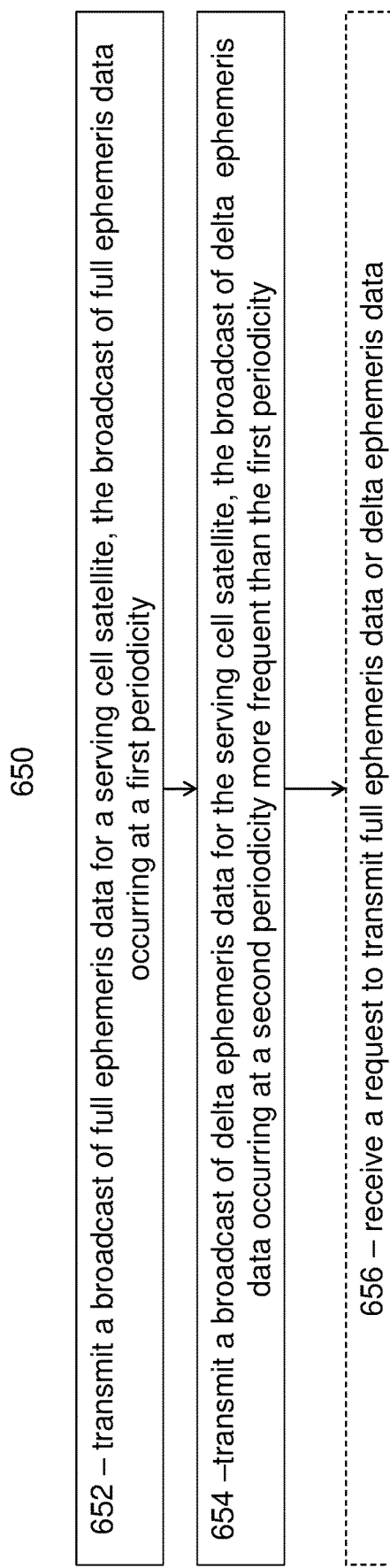
FIG. 6B is a flowchart illustrating an example method in a network node, according to certain embodiments.

FIG. 6B is a flowchart illustrating an example method in a network node, according to certain embodiments. In particular embodiments, one or more steps of FIG. 6B may be performed by network node 160 described with respect to FIG. 4.

The method begins at step 652, where the network node (e.g., network node 160) transmits a broadcast of full ephemeris data for a serving cell satellite. The broadcast of full ephemeris data occurs at a first periodicity. The network node broadcasts the full ephemeris data according to any of the embodiments and examples described herein.

At step 654, the network node transmits a broadcast of delta ephemeris data for the serving cell satellite. The broadcast of delta ephemeris data occurs at a second periodicity more frequent than the first periodicity. The network node broadcasts the delta ephemeris data according to any of the embodiments and examples described herein.

Modifications, additions, or omissions may be made to method 650 of FIG. 6B. Additionally, one or more steps in the method of FIG. 6B may be performed in parallel or in any suitable order.

Figure 7:
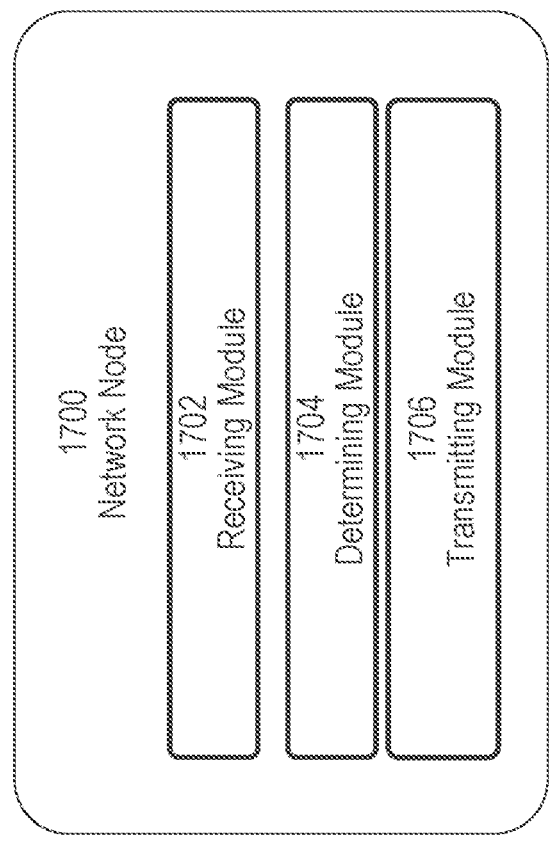
FIG. 7 illustrates a schematic block diagram of a wireless device in a wireless network, according to certain embodiments.
Figure 7:
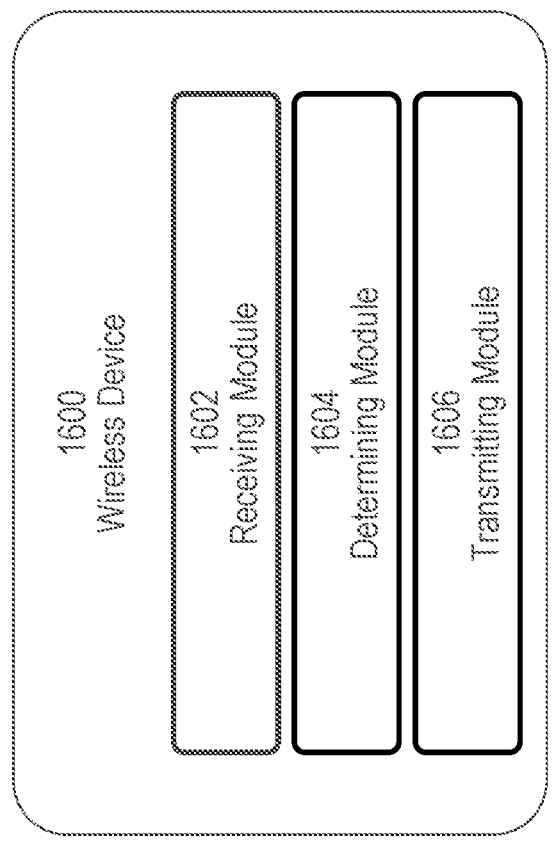

FIG. 7 illustrates a schematic block diagram of two apparatuses in a wireless network (for example, the wireless network illustrated in FIG. 4). The apparatuses include a wireless device and a network node (e.g., wireless device 110 and network node 160 illustrated in FIG. 1). Apparatuses 1600 and 1700 are operable to carry out the example methods described with reference to FIGS. 6A and 6B, respectively, and possibly any other processes or methods disclosed herein. It is also to be understood that the methods of FIGS. 6A and 6B are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 5, apparatus 1600 includes receiving module 1602 configured to receive ephemeris data according to any of the embodiments and examples described herein. Determining module 1604 is configured to determine a position of a satellite based on the ephemeris data according to any of the embodiments and examples described herein. Transmitting module 1606 is configured to transmit a request for ephemeris data to a network node according to any of the embodiments and examples described herein.

As illustrated in FIG. 5, apparatus 1700 includes receiving module 1702 configured to receive a request for ephemeris data according to any of the embodiments and examples described herein. Determining module 1704 is configured to determine ephemeris data and periodicities for transmitting ephemeris data according to any of the embodiments and examples described herein. Transmitting module 1706 is configured to transmit ephemeris data to a wireless device, according to any of the embodiments and examples described herein.

Figure 8:
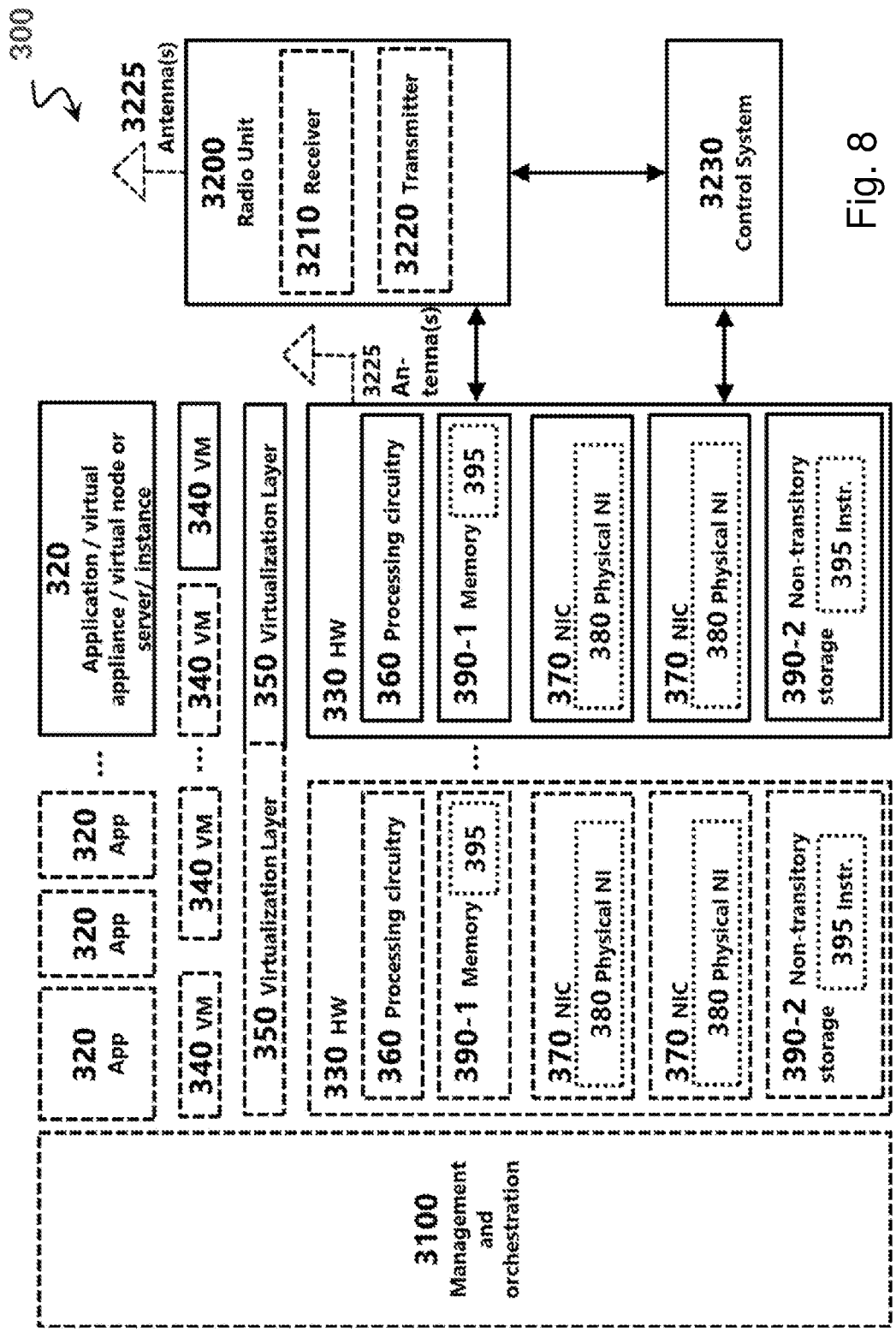
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 9:
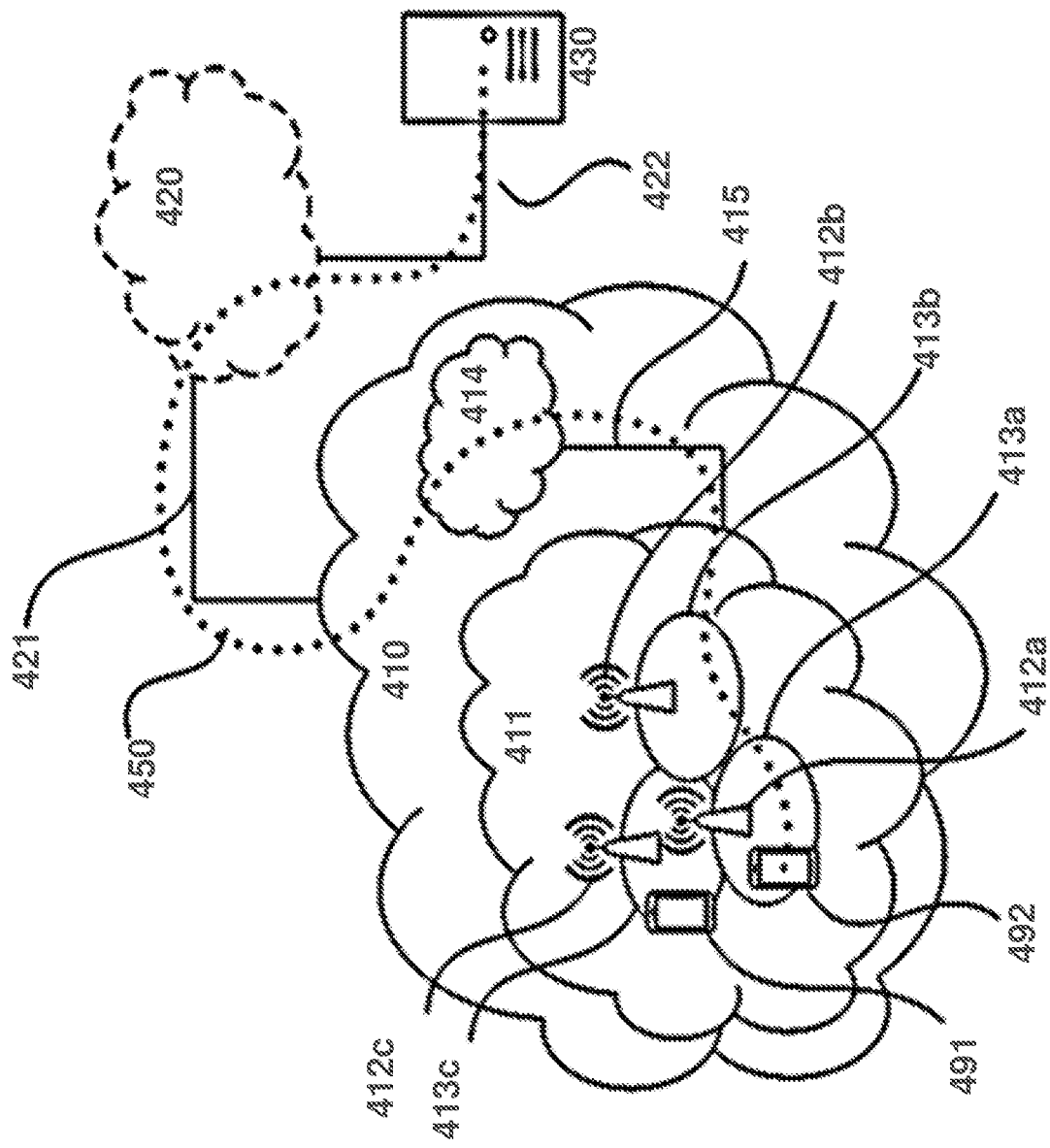
FIG. 9 illustrates an example telecommunication network connected via an intermediate network to a host computer, according to certain embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
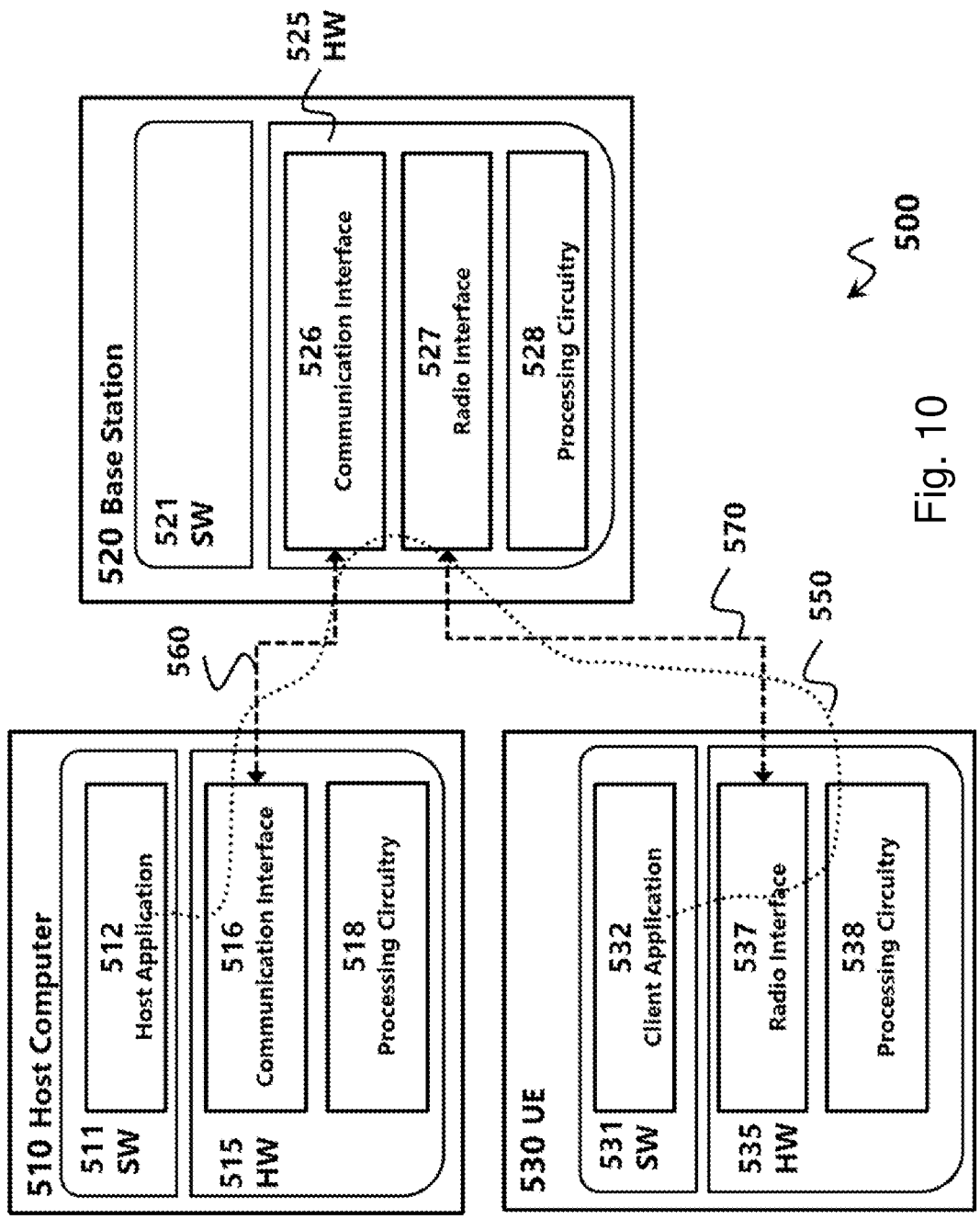
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412*a*, 412*b*, 412*c* and one of UEs 491, 492 of FIG. 4, respectively. This is to say, the inner workings of these entities may be as shown in FIG. 10 and independently, the surrounding network topology may be that of FIG. 4.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
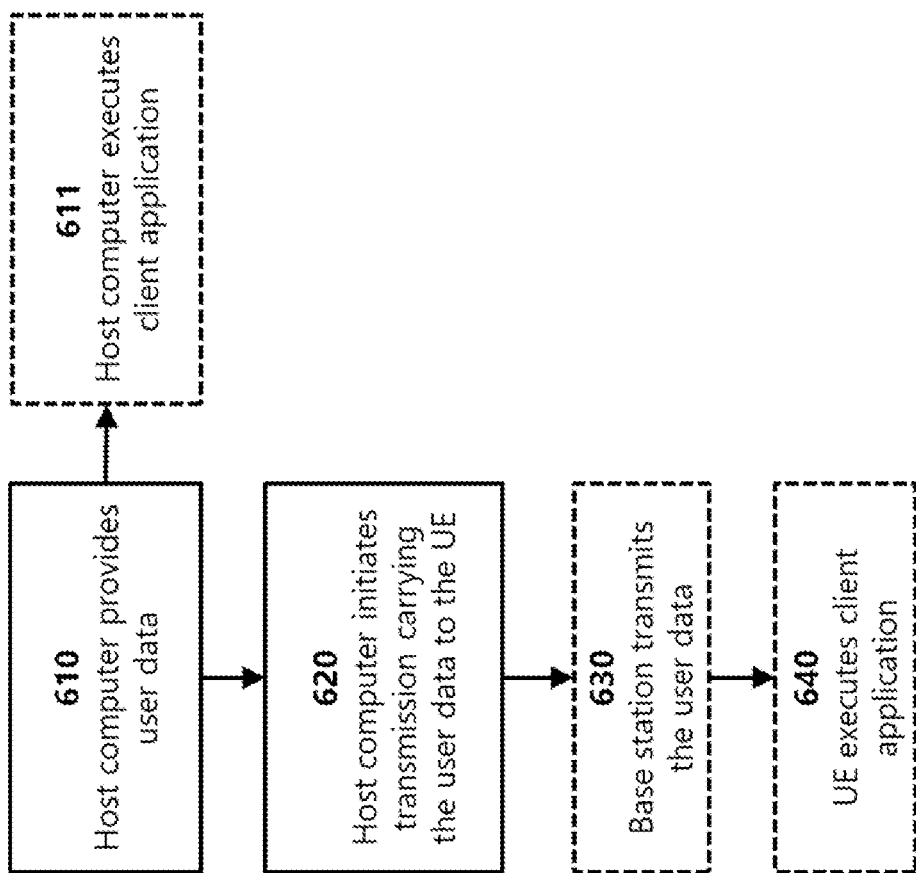
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
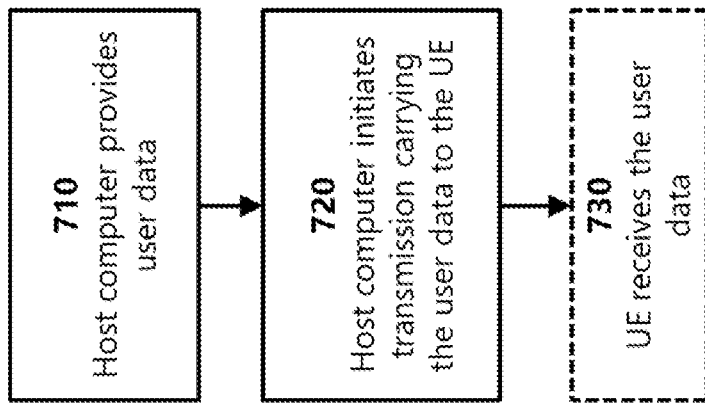
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
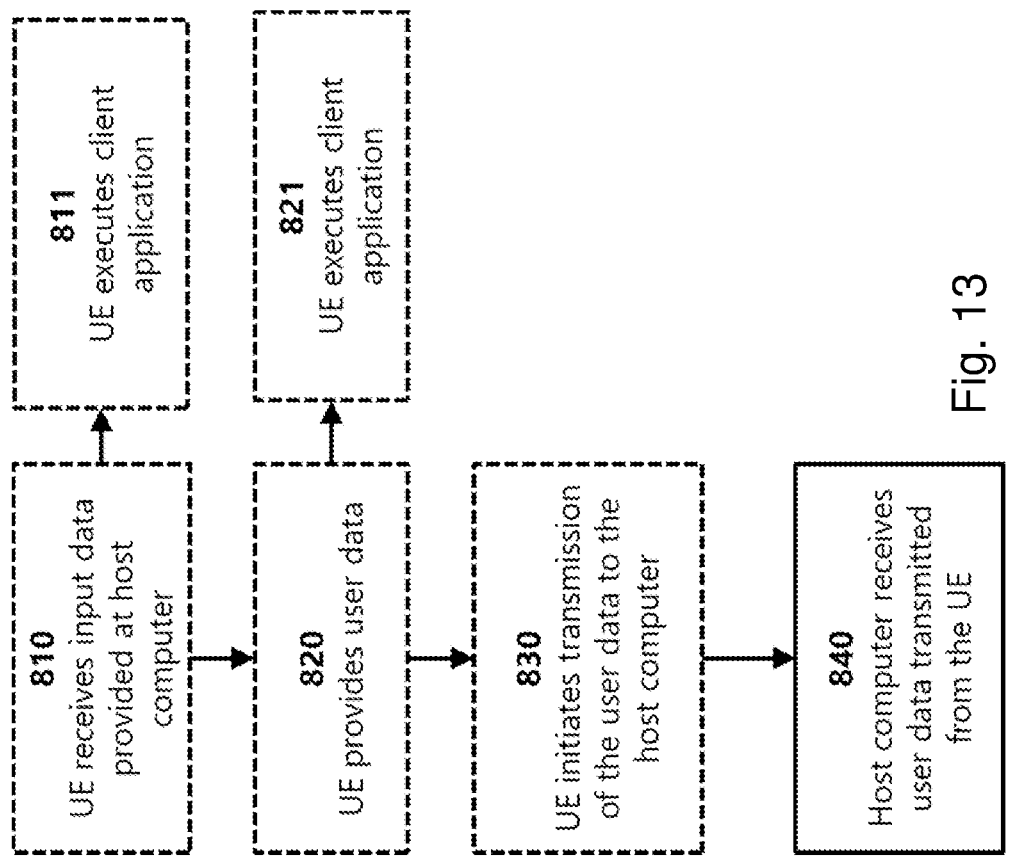
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
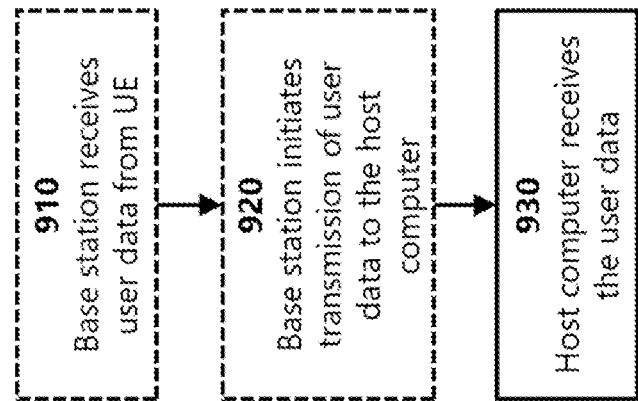
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device, the method comprising:
   receiving a broadcast of full ephemeris data for a serving cell satellite, the broadcast of full ephemeris data occurring at a first periodicity;
   determining a position of the serving cell satellite based on the full ephemeris data;
   receiving a broadcast of delta ephemeris data for the serving cell satellite, the broadcast of delta ephemeris data occurring at a second periodicity more frequent than the first periodicity; and
   determining a position of the serving cell satellite based on the full ephemeris data and the delta ephemeris data.

2. The method of claim 1, wherein the delta ephemeris data comprises a delta based on the full ephemeris data.

3. The method of claim 1, wherein the delta ephemeris data is cumulative based on a previous delta ephemeris data.

4. The method of claim 1, wherein the full ephemeris data and the delta ephemeris data are received via system information.

5. The method of claim 1, wherein the first periodicity of the full ephemeris data is increased in time leading up to and until just after a cell switch.

6. The method of claim 1, further comprising transmitting a request to receive full ephemeris data or delta ephemeris data.

7. The method of claim 6, wherein the request is transmitted over a random access channel (RACH).

8. The method of claim 1, wherein the ephemeris data is based on a coordinate system with an origin close to a trajectory of the serving cell satellite.

9. A wireless device comprising processing circuitry operable to:
   receive a broadcast of full ephemeris data for a serving cell satellite, the broadcast of full ephemeris data occurring at a first periodicity;
   determine a position of the serving cell satellite based on the full ephemeris data;
   receive a broadcast of delta ephemeris data for the serving cell satellite, the broadcast of delta ephemeris data occurring at a second periodicity more frequent than the first periodicity; and
   determine a position of the serving cell satellite based on the full ephemeris data and the delta ephemeris data.

10. The wireless device of claim 9, wherein the delta ephemeris data comprises a delta based on the full ephemeris data.

11. The wireless device of claim 9, wherein the delta ephemeris data is cumulative based on a previous delta ephemeris data.

12. The wireless device of claim 9, wherein the full ephemeris data and the delta ephemeris data are received via system information.

13. The wireless device of claim 9, wherein the first periodicity of the full ephemeris data is increased in time leading up to and until just after a cell switch.

14. The wireless device of claim 9, the processing circuitry further operable to transmit a request to receive full ephemeris data or delta ephemeris data.

15. The wireless device of claim 14, wherein the request is transmitted over a random access channel (RACH).

16. The wireless device of claim 9, wherein the ephemeris data is based on a coordinate system with an origin close to a trajectory of the serving cell satellite.

17. A method performed by a network node, the method comprising:
   transmitting a broadcast of full ephemeris data for a serving cell satellite, the broadcast of full ephemeris data occurring at a first periodicity; and
   transmitting a broadcast of delta ephemeris data for the serving cell satellite, the broadcast of delta ephemeris data occurring at a second periodicity more frequent than the first periodicity.

18. A network node comprising processing circuitry operable to:
   transmit a broadcast of full ephemeris data for a serving cell satellite, the broadcast of full ephemeris data occurring at a first periodicity; and
   transmit a broadcast of delta ephemeris data for the serving cell satellite, the broadcast of delta ephemeris data occurring at a second periodicity more frequent than the first periodicity.

19. The network node of claim 18, wherein the delta ephemeris data comprises a delta based on the full ephemeris data.

20. The network node of claim 18, wherein the delta ephemeris data is cumulative based on a previous delta ephemeris data.

21. The network node of claim 18, wherein the full ephemeris data and the delta ephemeris data are transmitted via system information.

22. The network node of claim 18, wherein the first periodicity of the full ephemeris data is increased in time leading up to and until just after a cell switch.

23. The network node of claim 18, the processing circuitry further operable to receive a request to transmit full ephemeris data or delta ephemeris data.

24. The network node of claim 23, wherein the request is received over a random access channel (RACH).

25. The network node of claim 18, wherein the ephemeris data is based on a coordinate system with an origin close to a trajectory of the serving cell satellite.

* * * * *